United States Patent
Schuehmacher et al.

(10) Patent No.: US 11,643,873 B2
(45) Date of Patent: May 9, 2023

(54) ELECTROMECHANICAL HOME-AUTOMATION ACTUATOR

(71) Applicant: SOMFY ACTIVITES SA, Cluses (FR)

(72) Inventors: Cyril Schuehmacher, Sallanches (FR); Sébastien Lemaître, Mieussy (FR); Jérôme Pezet, Taninges (FR); Adrien Brondex, Domancy (FR); Eric Lagarde, Sallanches (FR)

(73) Assignee: SOMFY ACTIVITES SA, Cluses (FR)

( * ) Notice: Subject to any disclaimer, the term of this patent is extended or adjusted under 35 U.S.C. 154(b) by 286 days.

(21) Appl. No.: 17/264,151

(22) PCT Filed: Jul. 31, 2019

(86) PCT No.: PCT/EP2019/070700
§ 371 (c)(1),
(2) Date: Jan. 28, 2021

(87) PCT Pub. No.: WO2020/025707
PCT Pub. Date: Feb. 6, 2020

(65) Prior Publication Data
US 2021/0285286 A1 Sep. 16, 2021

(30) Foreign Application Priority Data
Aug. 1, 2018 (FR) ...................................... 1857198

(51) Int. Cl.
*E06B 9/72* (2006.01)
*E06B 9/17* (2006.01)
*F16F 1/373* (2006.01)

(52) U.S. Cl.
CPC ............ *E06B 9/72* (2013.01); *E06B 9/17076* (2013.01); *F16F 1/3732* (2013.01); *F16F 2224/025* (2013.01)

(58) Field of Classification Search
CPC ...... E06B 9/72; E06B 9/17076; F16F 1/3732; F16F 2224/025
See application file for complete search history.

(56) References Cited

U.S. PATENT DOCUMENTS 6,979,962 B2  12/2005  Cavarec et al.
10,770,950 B2  9/2020  Lemaître et al.
(Continued)

FOREIGN PATENT DOCUMENTS

CN  201667569 U  12/2010
DE  9218638 U1  11/1994
(Continued)

OTHER PUBLICATIONS

International Search Report and Written Opinion dated Oct. 9, 2019 in counterpart application No. PCT/EP2019/070700; w/ English machine translation (total 21 pages).

*Primary Examiner* — Beth A Stephan
(74) *Attorney, Agent, or Firm* — Seckel IP, PLLC

(57) ABSTRACT

Home-automation actuator (11) comprising a motor (16), a housing (17), a mechanical module for filtering vibrations (33; 33*a*; 33*b*; 33*c*), a module for absorbing vibrations (130) and a torque support (21), the mechanical module comprising a first end (35, 135) and a second end (39, 139), —the first end (35, 135) being connected to the housing (17), —the second end (39, 139) being connected to the torque support (21), the mechanical module providing the connection between the housing (17) and the torque support so as to rotate around a first axis (X) of the actuator, the absorption module translationally connecting the housing (17) to the torque support (21) allowing a rotational degree of freedom between the housing (17) and the torque support (21).

20 Claims, 6 Drawing Sheets

(56) References Cited

U.S. PATENT DOCUMENTS

| | | | |
|---|---|---|---|
| 11,136,820 B2* | 10/2021 | Schuehmacher | ... F16F 15/1207 |
| 2005/0206334 A1 | 9/2005 | Cavarec et al. | |
| 2016/0124418 A1* | 5/2016 | Lagarde | ................... E06B 9/72 |
| | | | 318/630 |
| 2020/0099271 A1 | 3/2020 | Lemaitre et al. | |

FOREIGN PATENT DOCUMENTS

| | | |
|---|---|---|
| DE | 19949941 A1 | 4/2001 |
| FR | 3059699 A1 | 6/2018 |
| WO | 2005090736 A1 | 9/2005 |
| WO | 2018104488 A1 | 6/2018 |

* cited by examiner

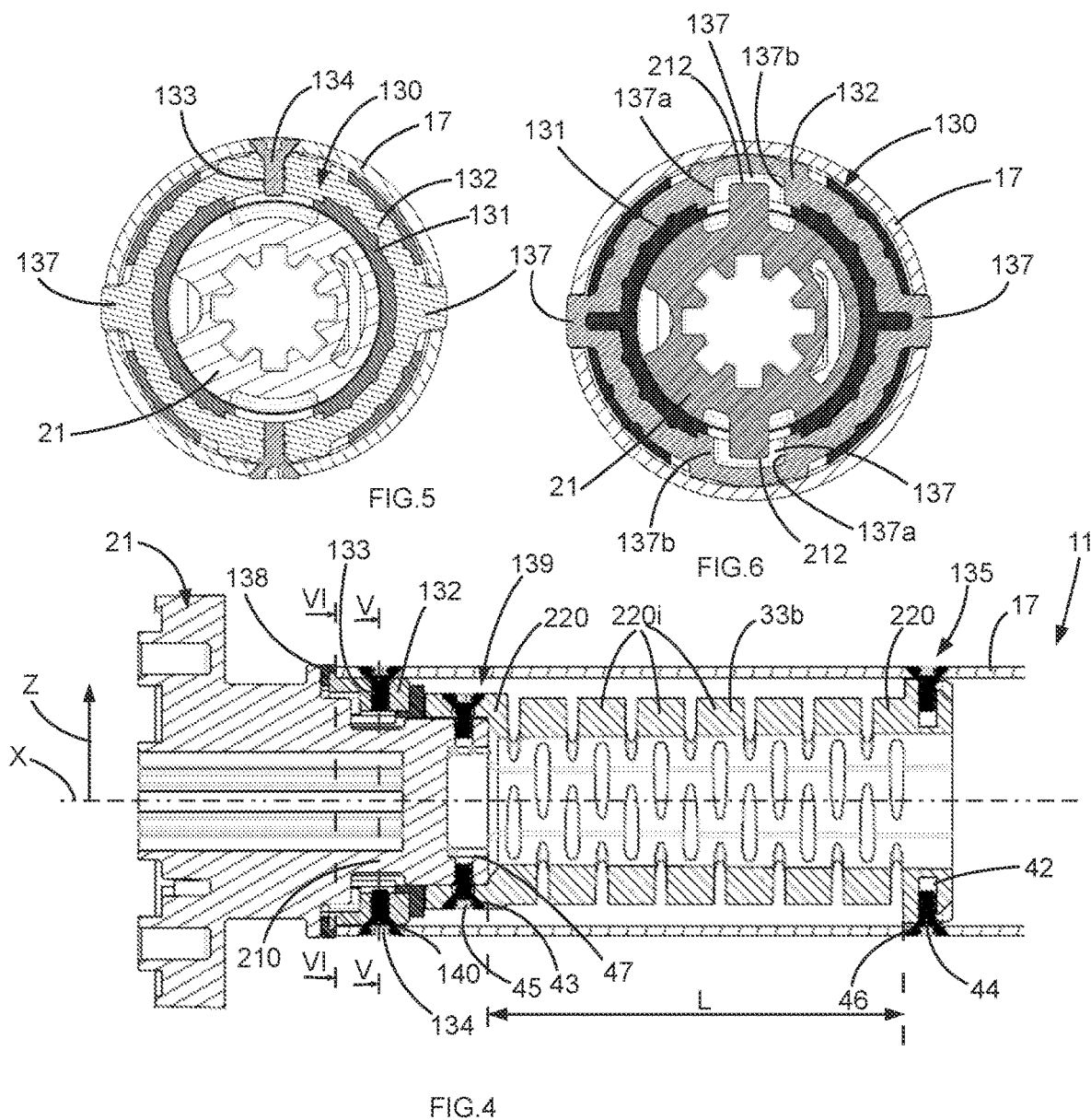

ELECTROMECHANICAL HOME-AUTOMATION ACTUATOR

The invention relates to an actuator for a closure, covering or solar protection installation. The invention relates also to an installation comprising one such actuator.

Generally, the present invention relates to the field of the closure, covering or solar protection devices that comprise a motorized drive device that sets a screen in motion, between at least one first position and at least one second position.

A motorized drive device comprises an electromechanical actuator of a mobile closure, covering or solar protection element such as a shutter, a door, a grill, a blind or any other equivalent equipment item, hereinafter called "screen".

The electromechanical actuator is intended to be mounted inside a winding tube on which the screen is wound. Furthermore, the electromechanical actuator comprises at least one electric motor and a reducing gear. The electric motor and the reducing gear generate vibrations, when the electromechanical actuator is operating. These vibrations are transmitted to the elements surrounding the electric motor, notably to a casing of the electromechanical actuator, to the winding tube and to the structure supporting the actuator.

Consequently, when the electromechanical actuator is operated and in an assembled configuration of the electromechanical actuator in the installation, the electromechanical actuator generates noise.

The document WO2005/090736A1, which describes vibration dampers mounted inside a casing of an electromechanical actuator for a closure or solar protection installation, is already known. It appears that the filtering of the vibrations between the casing of the actuator and the support by which it is fixed to the building structure is not optimal in the embodiments described in that document.

The aim of the invention is to provide an actuator that remedies the drawbacks mentioned and enhances the actuators known from the prior art. In particular, the invention proposes a simple actuator in which the damping of the vibrations transmitted by the actuator to the structure supporting it is enhanced.

According to the invention, an electromechanical actuator for a closure, covering or solar protection installation comprises an electric motor, a casing, a vibration-filtering mechanical module, a vibration-absorption module and a torque support, inserted at least partially into the casing, the vibration-filtering mechanical module comprising a first end and a second end, separated by a length L. The first end of the vibration-filtering mechanical module is mechanically linked directly or indirectly to the casing. The second end of the vibration-filtering mechanical module is mechanically linked to the torque support. The vibration-filtering mechanical module ensures the mechanical link between the casing and the torque support in rotation about a first axis of the actuator. The vibration-absorption module mechanically links the casing to the torque support in translation perpendicularly to the first axis of the actuator by allowing a degree of free rotation between the casing and the torque support about the first axis.

The vibration-filtering mechanical module can comprise an Oldham coupling or a Schmidt coupling.

The vibration-filtering mechanical module can comprise at least:
- a first end portion comprising a first ring,
- an intermediate portion; and
- a plurality of first arms, each first arm linking the intermediate portion to the first ring.

The vibration-filtering mechanical module can comprise several annular plates disposed perpendicularly to the first axis and juxtaposed along the first axis, including at least one intermediate annular plate, each intermediate annular plate being linked to each of the two plates which are adjacent to it by at least three connection bridges.

The casing can partially or fully cover the vibration-filtering mechanical module and/or the vibration-absorption module.

The vibration-absorption module can comprise a first bushing made of flexible material, notably of elastomer and/or viscoelastic material, disposed around a part of the torque support.

The first bushing made of flexible material can comprise bosses forming its surface or surfaces in contact with the casing and/or the torque support.

The vibration-absorption module can comprise a second bushing made of rigid material, disposed around the first bushing or inserted into the first bushing.

The second bushing made of rigid material can comprise zones of reinforcement and/or of overthickness.

The second bushing can comprise at least one fixing element for fixing to the casing, notably at least one rib and/or at least one groove and/or at least one hole, in particular at least one tapped hole.

The vibration-absorption module can comprise a flange ring disposed axially between the torque support and an axial end of the casing.

The casing and/or the vibration-absorption module can comprise a first stop and the torque support can comprise a second stop, the first and second stops being arranged so as to cooperate by contact to limit the rotational displacement of the casing about the first axis relative to the torque support, notably the first and second stops being intended to cooperate by contact when a torque greater than the nominal torque, notably greater than or equal to 110% of the nominal torque, is produced by the electric motor.

The actuator can comprise a housing for at least one battery in the casing.

According to the invention, a closure, covering or solar protection home-automation installation comprises a screen, a winding tube and an electromechanical actuator as defined previously, the screen being able to be wound on the winding tube driven in rotation by the electromechanical actuator.

The invention will be better understood on reading the following description, given purely by way of example and done with reference to the attached drawings, in which:

FIG. 4 is a partial longitudinal cross-sectional view of a part of a variant of the electromechanical actuator illustrated in FIG. 3;

FIG. 5 is a cross-sectional view of the actuator on the plane V-V represented in FIG. 4;

FIG. 6 is a cross-sectional view of the actuator on the plane VI-VI represented in FIG. 4;

Figure 1:
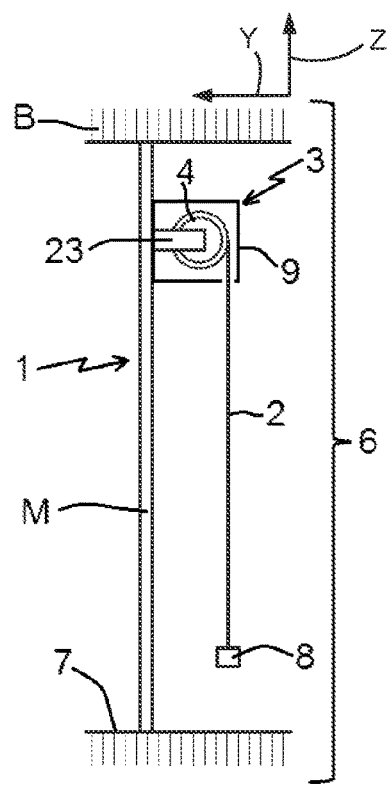
FIG. 1 is a cross-sectional schematic view of an installation according to an embodiment.
Figure 2:
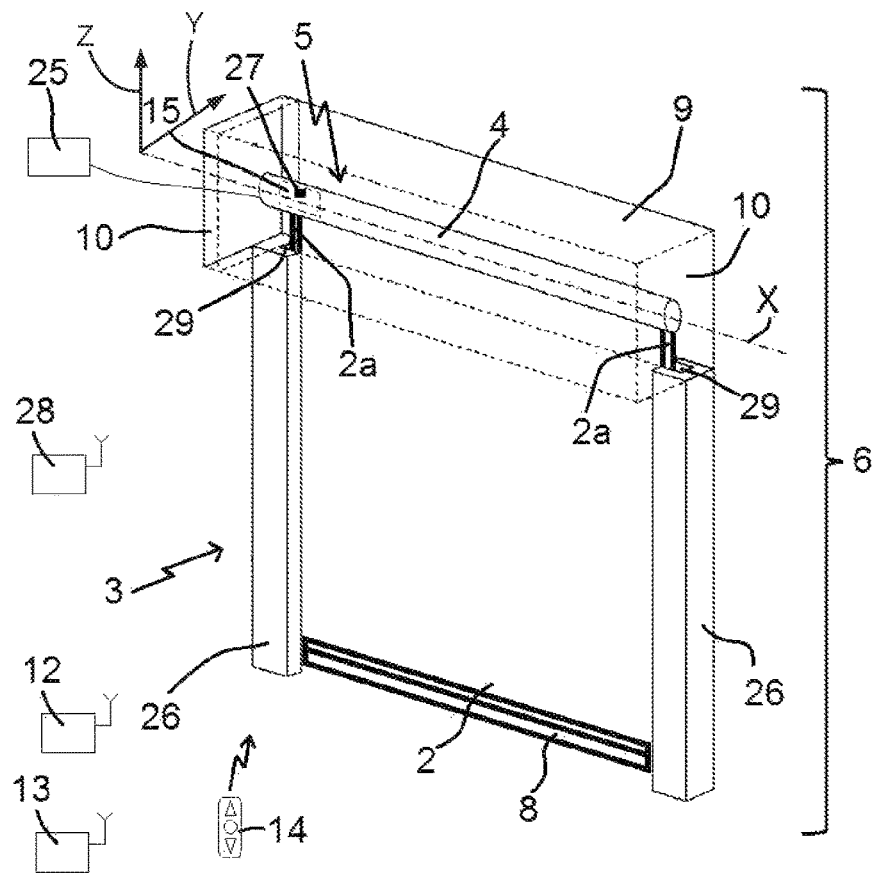
FIG. 2 is a perspective schematic view of the installation illustrated in FIG. 1.

An embodiment of an installation 6 is described first of all with reference to FIGS. 1 and 2. This installation is installed in a building B comprising an opening 1, notably a window or a door. The installation 6 comprises a closure, covering or solar protection device 3, in particular a motorized blind. The device 3 comprises a screen 2.

The device 3 can be a blind, notably a windable cloth, a folded blind or a slatted blind. The device 3 can also be a rolling shutter or even a rolling doorway. The device 3 can even be of any other type.

Also described, with reference to FIGS. 1 and 2, is an embodiment of the device 3 in the form of a windable motorized blind 3.

The device 3 comprises a winding tube 4 and a motorized drive device 5 comprising an electromechanical actuator 11.

The screen 2 of the device 3 is wound onto the winding tube 4 driven by the motorized drive device 5. Thus, the screen is movable between a wound position, in particular a high position, and an unwound position, in particular a low position.

The screen 2 of the covering device 3 is a closure, covering and/or solar protection screen, that is wound or unwound around the winding tube 4, the internal diameter of which is substantially greater than the outer diameter of the electromechanical actuator 11, such that the electromechanical actuator 11 can be inserted into the winding tube 4 upon the assembly of the device 3.

Advantageously, the device 3 comprises a holding device 9, 23. For example, the holding device 9, 23 can comprise two supports 23. A support 23 is disposed at each end of the winding tube 4, in an assembled configuration of the device 3. Thus, the winding tube 4 is held via the supports 23. Just one of the supports 23 is represented in FIG. 1. The supports 23 allow the device 3 to be mechanically linked to the structure of the building B, notably to a wall M of the building B.

Advantageously, the holding device 9, 23 can comprise a box section 9. Furthermore, the winding tube 4 and at least a part of the screen 2 are housed inside the box section 9, in the assembled configuration of the device 3. Generally, the box section 9 is disposed above the opening 1, or even in the upper part of the opening 1. As illustrated in FIG. 1, the supports 23 are preferably also housed inside the box section 9.

As a variant, represented in FIG. 2, the winding tube 4 is held via the box section 9, in particular via lateral parts 10 of the box section 9.

Advantageously, the device 3 can also comprise two lateral guides 26, as illustrated in FIG. 2. Each lateral guide 26 comprises a groove 29. Each groove 29 of one of the lateral guides 26 cooperates, in other words is configured to cooperate, with a lateral edge 2a of the screen 2, in the assembled configuration of the device 3, so as to guide the screen 2, in the winding and the unwinding of the screen 2 around the winding tube 4.

The electromechanical actuator 11 is, for example, of tubular type. It allows the winding tube 4 to be rotated about its longitudinal axis X so as to unwind or wind the screen 2 of the device 3.

In the mounted state, the electromechanical actuator 11 is inserted into the winding tube 4.

Advantageously, the device 3 also comprises a loading bar 8 for exerting a tension on the screen 2.

The windable blind, which forms the device 3, comprises a cloth, forming the screen 2 of the windable blind 3. A first end of the screen 2, in particular the top end of the screen 2, in the assembled configuration of the device 3, is fixed to the winding tube 4. Furthermore, a second end of the screen 2, in particular the bottom end of the screen 2, in the assembled configuration of the device 3, is fixed to the loading bar 8.

For example, the cloth forming the screen 2 is produced from a fabric material.

In an exemplary embodiment, not represented, the first end of the screen 2 has a hem through which a rod, in particular made of plastic material, is disposed. This hem produced at the first end of the screen 2 is obtained by means of stitching of the cloth forming the screen 2. When the screen 2 is assembled on the winding tube 4, the hem and the rod situated at the first end of the screen 2 are inserted by sliding in a groove formed on the outer face of the winding tube 4, in particular over the entire length of the winding tube 4, so as to be able to wind and unwind the screen 2 around the winding tube 4.

In the case of a windable blind, the wound high position corresponds to a predetermined high end-of-travel position, or even to the bringing of the loading bar 8 of the screen 2 to bear against an edge of a box section 9 of the windable blind 3, and the unwound low position corresponds to a predetermined low end-of-travel position, or to the bringing of the loading bar 8 of the screen 2 to bear against a sill 7 of the opening 1, or even to the complete unwinding of the screen 2.

Advantageously, the motorized drive device 5 is controlled by a control unit. The control unit can be, for example, a local control unit 12 or a central control unit 13.

Advantageously, the local control unit 12 can be linked by wired or wireless link with the central control unit 13.

Advantageously, the central control unit 13 can drive the local control unit 12, and other similar local control units distributed throughout the building.

Advantageously, the central control unit 13 can be in communication with a weather station disposed inside the building B or remotely sited outside the building B, including, notably, one or more sensors that can be configured to determine, for example, a temperature, a brightness, or even a wind speed, in the case where the weather station is remotely sited outside of the building B.

A remote control 14, that can be of the local control unit type, and provided with a control keypad, which comprises selection and display elements, also allows a user to intervene on the electromechanical actuator 11 and/or the central control unit 13.

The motorized drive device 5 is, preferably, configured to execute the commands for unwinding or winding the screen 2 of the device 3, that can be transmitted, notably, by the local control unit 12, the central control unit 13 or the remote control 14.

Figure 3:
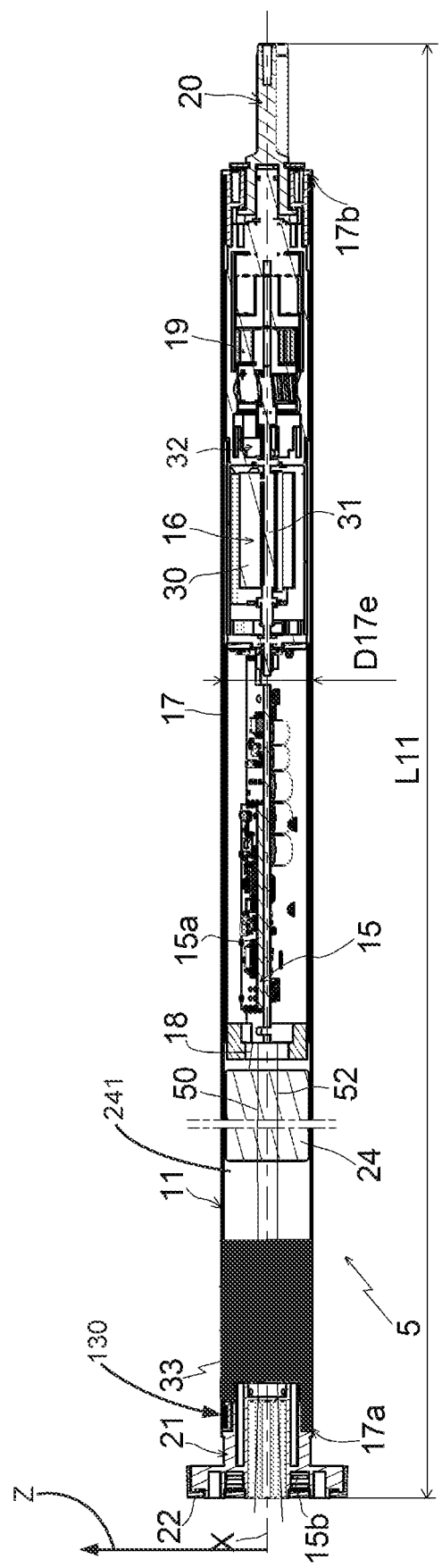
FIG. 3 is a schematic cross-sectional view of an embodiment of an electromechanical actuator of the installation illustrated in FIGS. 1 and 2.
Figure 7:
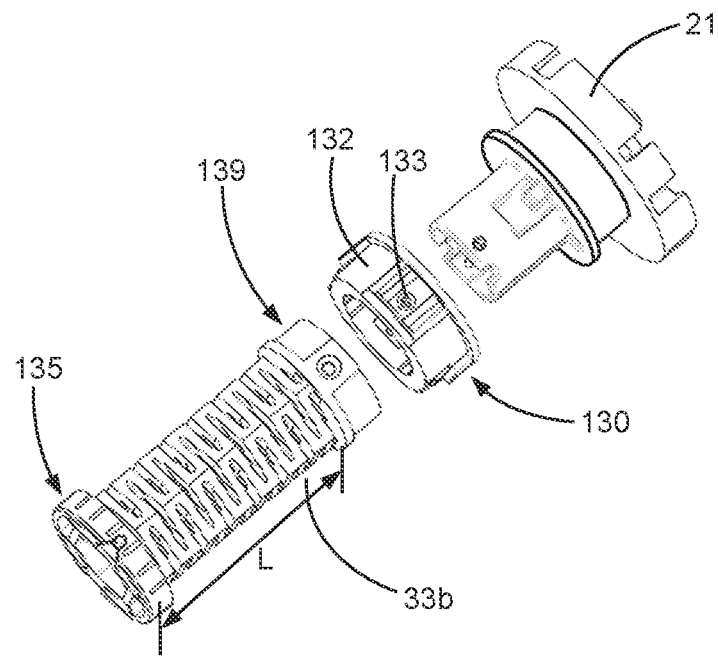
FIG. 7 is an exploded and perspective view of a part of the actuator.

An embodiment of the electromechanical actuator 11 of FIGS. 1 and 2 is now described in more detail and with reference to FIG. 3.

The electromechanical actuator 11 comprises an electric motor 16. The electric motor 16 comprises a rotor 31 and a stator 30, positioned coaxially about an axis of rotation X, which is also the axis of rotation of the winding tube 4 in the mounted configuration of the motorized drive device 5.

Control means of the electromechanical actuator 11, allowing the displacement of the screen 2 of the device 3, comprise at least one electronic control unit 15. This electronic control unit 15 can operate the electric motor 16 of the electromechanical actuator 11, and, in particular, allow the supply of electrical energy to the electric motor 16.

Thus, the electronic control unit 15 controls, in particular, the electric motor 16, so as to open, notably wind, or close, notably unwind, the screen 2, as described previously.

Advantageously, the electronic control unit 15 also comprises a communication module 27, as illustrated in FIG. 2, in particular for receiving control commands. The control commands are transmitted by a command transmitter, such as the remote control 14 intended to control the electromechanical actuator 11 or one of the local 12 or central 13 control units.

Preferentially, the communication module 27 of the electronic control unit 15 is of wireless type. In particular, the communication module 27 is configured to receive radiofrequency control commands.

The communication module 27 can also allow the reception of control commands transmitted by wired means.

The central control unit 13, the local control unit 12 or the electronic control unit 15 can also be in communication with a server 28, as illustrated in FIG. 2, so as to control the electromechanical actuator 11 according to data made available remotely via a communication network, in particular an internet network that can be linked to the server 28.

The control means of the electromechanical actuator 11 comprise hardware and/or software means.

As a nonlimiting example, the hardware means can comprise at least one microcontroller.

Advantageously, the electromechanical actuator 11 is supplied with electrical energy by means of at least one battery 24.

Here, the electromechanical actuator 11 comprises an electrical power supply cable 18 allowing it to be supplied with electrical energy, in particular from the battery 24.

Advantageously, the battery 24 is of rechargeable type and supplies electrical energy to the electromechanical actuator 11.

Advantageously, the battery 24 is disposed in a housing 241 inside the casing 17 of the electromechanical actuator 11.

Advantageously, the battery 24 comprises one or more energy storage elements, which are not represented. The energy storage elements of the battery 24 can be, notably, rechargeable storage cells or even rechargeable cells.

Advantageously, the motorized drive device 5, notably the actuator 11, in particular the electronic control unit 15, comprises charging elements configured to charge the battery 24 from the electrical energy supplied by an external electrical power source 25, as illustrated in FIG. 2.

As a nonlimiting example, the external electrical power source 25 can be a charger that can be connected to a wall power outlet, so as to recharge the battery 24 from a mains electrical power supply network.

As a variant, not represented, the external electrical power source 25 is an auxiliary battery, so as to recharge the battery 24.

Thus, the battery 24 can be recharged by means of the auxiliary battery forming the external electrical power source 25, in particular in the case where the device 3 is remote from a wall power socket.

Advantageously, the electronic control unit 15 comprises a first electronic circuit board 15a and a second electronic circuit board 15b.

Advantageously, the first electronic circuit board 15a is configured to control the electric motor 16. Furthermore, the second electronic circuit board 15b is configured to control the battery 24, notably to manage the charging or the recharging of the battery. This electronic circuit board 15b can notably support one or more pushbuttons, one or more light-emitting diodes, and, for example, programming input-output contacts.

Here, in a nonlimiting manner, the charging elements are disposed on the second electronic circuit board 15b.

As a variant, not represented, the electromechanical actuator 11 is supplied with electrical energy by a mains electrical power supply network.

The electromechanical actuator 11 comprises a casing 17, in particular tubular. For example, the casing 17 of the electromechanical actuator 11 is of cylindrical form, notably of revolution.

In an exemplary embodiment, the casing 17 is made from a metallic material.

The material of the casing of the electromechanical actuator is not limiting and can be different. It can be, in particular, a plastic material.

Advantageously, the electromechanical actuator 11 also comprises a reducing gear 19 and an output shaft 20.

Advantageously, the reducing gear 19 comprises at least one reduction stage. The reduction stage can be a gear train of epicyclic type.

The type and the number of reduction stages of the reducing gear are not limiting.

Advantageously, the electromechanical actuator 11 also comprises a brake 32.

As nonlimiting examples, the brake 32 can be a spring brake, a cam brake or an electromagnetic brake.

Advantageously, the electric motor 16, the reducing gear 19 and, possibly, the brake 32, are disposed inside the casing 17 of the electromechanical actuator 11.

Advantageously, the electromechanical actuator 11 can also comprise an end-of-travel and/or obstacle detection device, that can be mechanical or electronic.

The winding tube 4 is driven in rotation about the axis of rotation X and of the casing 17 of the electromechanical actuator 11 by being supported via two pivot links. The first pivot link is produced, at a first end of the winding tube 4, by means of a crown ring, not represented, inserted around a first end 17a of the casing 17 of the electromechanical actuator 11. The crown ring thus makes it possible to produce a bearing. The second pivot link, not represented, is produced at a second end of the winding tube 4.

Advantageously, the electromechanical actuator 11 comprises a torque support 21 (or actuator head 21). The torque support 21 is disposed at the first end 17a of the casing 17 of the electromechanical actuator 11, in an assembled configuration of the electromechanical actuator 11. The torque support makes it possible to take up the loads exerted by the actuator and ensure the absorption, by the structure of the building B, of the loads exerted by the actuator, in particular the torque exerted by the actuator. The torque support advantageously also makes it possible to absorb the loads exerted by the winding tube, notably the weight of the winding tube, of the actuator and of the screen, and ensure the absorption of these loads by the structure of the building B.

Thus, the torque support 21 of the electromechanical actuator 11 makes it possible to fix the electromechanical actuator 11 onto the holding device 9, 23, in particular to one of the supports 23 or to one of the lateral parts 10 of the box section 9.

Advantageously, the torque support 21 protrudes from the first end 17a of the casing 17 of the electromechanical actuator 11, in particular the end 17a of the casing 17 receiving the crown ring constituting a bearing guiding the rotation of the winding tube.

Advantageously, the torque support 21 of the electromechanical actuator 11 can also make it possible to seal the first end 17a of the casing 17.

Moreover, the torque support 21 of the electromechanical actuator 11 can make it possible to support at least a part of the electronic control unit 15.

Advantageously, the electronic control unit 15 can be supplied with electrical energy by means of the electrical power supply cable 18.

Advantageously, the electronic control unit 15 can be disposed at least partly inside the casing 17 of the electromechanical actuator 11.

Moreover, the electronic control unit 15 can be disposed at least partly outside the casing 17 of the electromechanical actuator 11 and, in particular, mounted on one of the two supports 23, on one of the lateral parts 10 of the box section 9 or in the torque support 21.

Here, the first electronic circuit board 15a of the electronic control unit 15 is disposed inside the casing 17 of the electromechanical actuator 11. Furthermore, the second electronic circuit board 15b is disposed inside the torque support 21 of the electromechanical actuator 11.

Here, and as illustrated in FIG. 3, the torque support 21 comprises a cover 22. Furthermore, the second electronic circuit board 15b is disposed inside a housing formed between the torque support 21 and the cover 22.

Advantageously, the torque support 21 comprises at least one button, not represented, so as to allow a setting of the electromechanical actuator 11, that can be, for example, an end-of-travel position or a resetting of the parameters of the electromechanical actuator 11.

Here, the torque support 21 comprises a single button.

The number of buttons of the torque support is not limiting and can be different. It can notably be greater than or equal to two.

Advantageously, the torque support 21 comprises at least one lighting device, not represented, so as to allow a visual indication, that can be, for example, a state of charge of the battery 24.

Advantageously, the lighting device comprises at least one lighting source, not represented, in particular a light-emitting diode, mounted on the second electronic circuit board 15b and, possibly, a transparent or translucent cap and/or a light guide, to allow the passage of the light emitted by the lighting source.

Here, the torque support 21 comprises a single lighting device.

The number of lighting devices is not limiting and can be different. It can notably be greater than or equal to two.

Advantageously, the output shaft 20 of the electromechanical actuator 11 is disposed inside the winding tube 4 and at least partly outside the casing 17 of the electromechanical actuator 11.

Here, an end of the output shaft 20 protrudes with respect to the casing 17 of the electromechanical actuator 11, in particular with respect to a second end 17b of the casing 17 opposite the first end 17a.

Advantageously, the output shaft 20 of the electromechanical actuator 11 is configured to rotationally drive a link element, not represented, linked to the winding tube 4. The link element is produced in the form of a wheel.

When the electromechanical actuator 11 is operated, the electric motor 16 and the reducing gear 19 drive the output shaft 20 in rotation.

Furthermore, the output shaft 20 of the electromechanical actuator 11 drives the winding tube 4 in rotation via the link element.

Thus, the winding tube 4 drives the screen 2 of the device 3 in rotation, so as to open or close the opening 1.

Preferably, the electromechanical actuator 11 comprises, in addition to the electric motor 16, the torque support 21 and the casing 17, a vibration-filtering mechanical module 33 and a vibration-absorption module 130. The vibration-filtering mechanical module 33 mechanically links the electric motor and/or the casing to the torque support at least in rotation about the axis X of the actuator. The vibration-absorption module mechanically links the casing to the torque support at least in translation perpendicularly to the first axis X of the actuator, in particular on a vertical axis Z, that is to say parallel to the direction of the Earth's gravitational field.

A direction Y is also defined as perpendicular to the directions X and Z.

Thus, the vibration-filtering mechanical module 33 makes it possible to transmit, primarily, or even exclusively, the torques around the axis X of the electric motor and/or of the casing to the torque support. For this, the vibration-filtering mechanical module mainly has a torsional rigidity (or stiffness) about the axis X between its first and second ends. Its rigidities (or stiffnesses) to the other stresses (tensile, compressive, flexural) regardless of the direction and the torsion in the directions Y or Z perpendicular to the direction X are much lower. These low rigidities allow the vibration-filtering mechanical module to transmit very little in the way of vibrations of tensile-compressive type regardless of the direction of these vibrations. These low rigidities also allow the vibration-filtering mechanical module to transmit very little in the way of vibrations of torsional type whose direction is perpendicular to the axis X. This makes it possible to optimize the physical characteristics of the vibration-filtering mechanical module for a good filtering of the vibrations with no constraint other than a mechanical resistance to torsion about the axis X. In other words, the vibration-filtering mechanical module 33 is arranged and/or configured so as to transmit essentially a torque (moment of force) about the direction X, that is to say that it is arranged and/or configured so as to minimize transmission of the other mechanical stresses (torques about the axes Y and Z and forces regardless of their directions).

The other loads which have to be absorbed by the torque support, primarily loads due to gravity on the axis Z and linked to the weight of the actuator, of the winding tube and of the screen, are transmitted to the torque support via the vibration-absorption module 130.

Thus, the vibration-absorption module is placed on a pathway of transfer of the structure-borne vibrations, that is to say radially relative to the axis X. The vibration-absorption module mainly has a compressive rigidity (or stiffness) on the axes perpendicular to the axis X. Its rigidities (or stiffnesses) to the other stresses (tensile, compressive) in the direction X and to axial recovery (torsional about the direction X) are much less great. This low compressive rigidity allows the vibration-absorption module to transmit very little in the way of vibrations between the casing 17 and the torque support 21. This makes it possible to optimize the physical characteristics of the vibration-absorption module for a good damping of the vibrations with no other constraints other than a great compressive flexibility on the axis Z perpendicular to the axis X. In other words, the vibration-absorption module 130 is arranged and/or configured so as to transmit essentially forces perpendicular to the direction X, that is to say that it is arranged and/or configured so as to minimize the transmission of the other mechanical stresses (moments of forces about the directions X, Y and Z and forces in the direction X).

Preferably, the vibration-filtering mechanical module 33 and the vibration-absorption module 130 are separate and distinct elements. They can be arranged at a distance from one another. They can also be arranged in contact with one another.

In an embodiment that is not represented, the vibration-filtering mechanical module can comprise or be an Oldham coupling. For example:
- the torque support comprises a first element or is fixed to a first element,
- the casing and/or the motor comprises a second element or is fixed to a second element, and
- a third element is linked to the first element by a first slide link and is linked to the second element by a second slide link, the first and second slide links having axes that are not parallel to one another, notably axes that are perpendicular to one another. The first and second slide links preferably have axes perpendicular to the axis X.

These slide links ensure degrees of freedom radially with respect to the axis X, which allows the Oldham coupling to cut the transmission of the vibrations in the directions Y and Z.

In an embodiment that is not represented, the vibration-filtering mechanical module can comprise or be a Schmidt coupling. For example:
- the torque support comprises a first element or is fixed to a first element,
- the casing and/or the motor comprises a second element or is fixed to a second element, and
- a third element is linked to the first element by a first mechanical link ensuring a circular translational movement between the third element and the first element and is linked to the second element by a second mechanical link ensuring a circular translational movement between the third element and the second element. The first and second mechanical links comprise, for example, first connecting rods linking the third element and the first element and second connecting rods linking the third element and the second element.

These links of ball joint or pivot type ensure degrees of freedom radially with respect to the axis X, which allows the Schmidt coupling to cut the transmission of the vibrations in the directions Y and Z.

Figure 10:
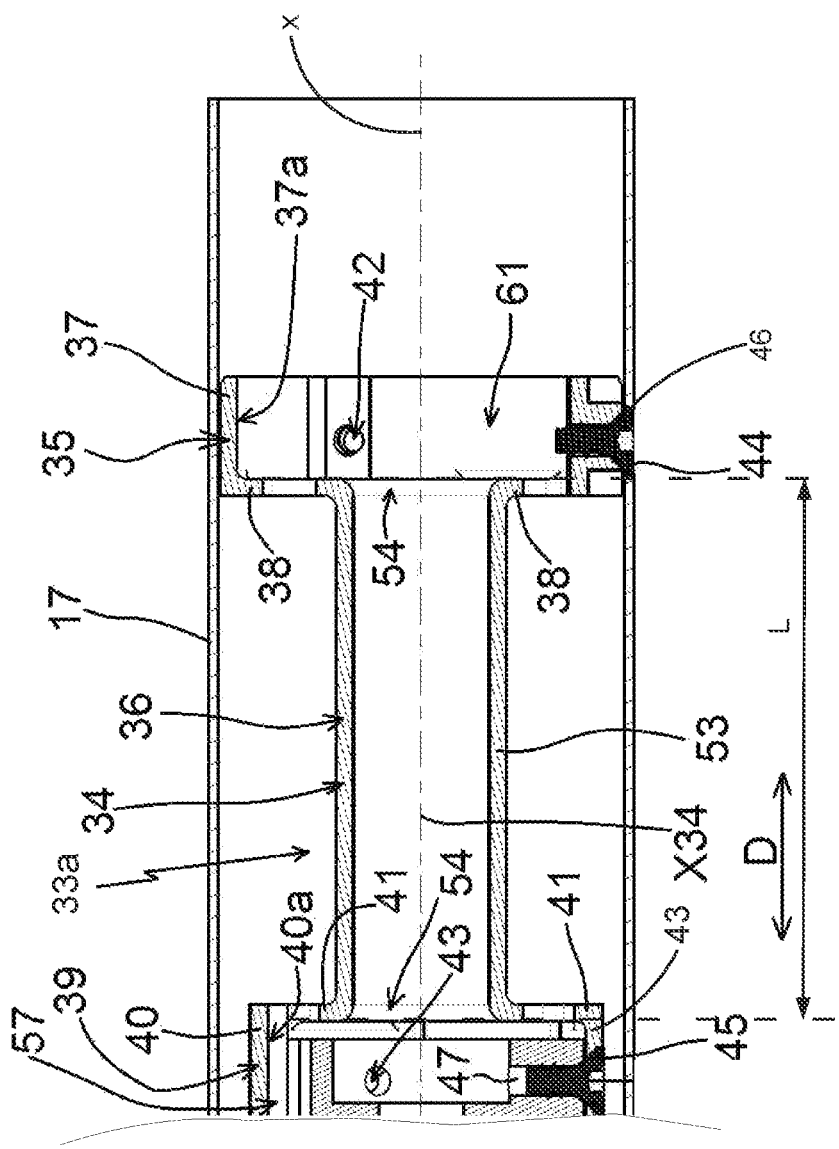
FIG. 10 is a partial longitudinal cross-sectional view of a part of a variant of the electromechanical actuator illustrated in FIG. 3.

In an embodiment represented in FIG. 10, the vibration-filtering mechanical module 33a comprises at least:
- a first end portion 35 comprising a first ring 37,
- an intermediate portion 36, and
- a plurality of first arms 38, each first arm 38 linking the intermediate portion 36 to the first ring 37.

Preferably, the vibration-filtering mechanical module 33a also comprises:
- a second end portion 39 comprising a second ring 40, and
- a plurality of second arms 41, each second arm 41 linking the intermediate portion 36 to the second ring 40.

The flexural flexibility of this type of vibration-filtering mechanical module 33a ensures a degree of freedom, even if the latter comprises a certain stiffness with respect to a degree of freedom of slide type as is possible with an Oldham coupling.

In an embodiment represented in FIGS. 4 to 9, the vibration-filtering mechanical module 33b comprises several annular plates 220 disposed perpendicular to the first axis X and juxtaposed along the first axis, including at least one intermediate annular plate 220i. Each intermediate annular plate is linked to each of the two plates which are adjacent to it by connection bridges, notably at least three connection bridges 228. These plates are arranged between a first end portion 135 and a second end portion 139.

Figure 11:
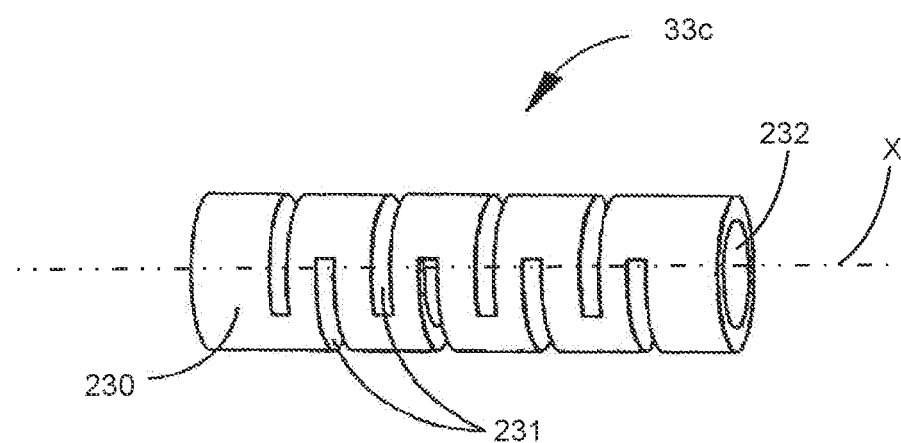
FIG. 11 is a perspective view of a variant of a central or intermediate part of a vibration-filtering module illustrated in FIG. 3.
Figure 8:
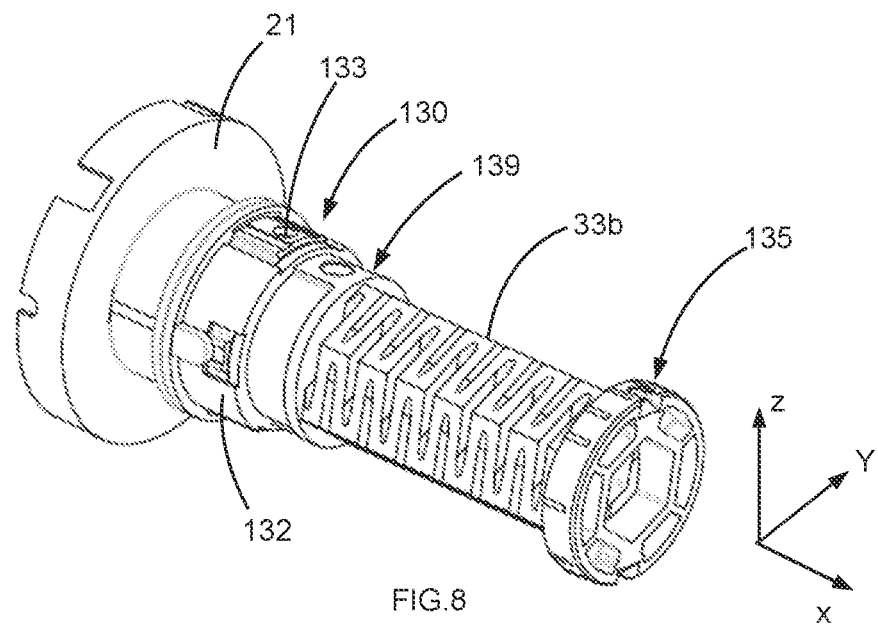
FIGS. 8 and 9 are perspective views of the part of the actuator represented in FIG. 7, after assembly.
Figure 9:
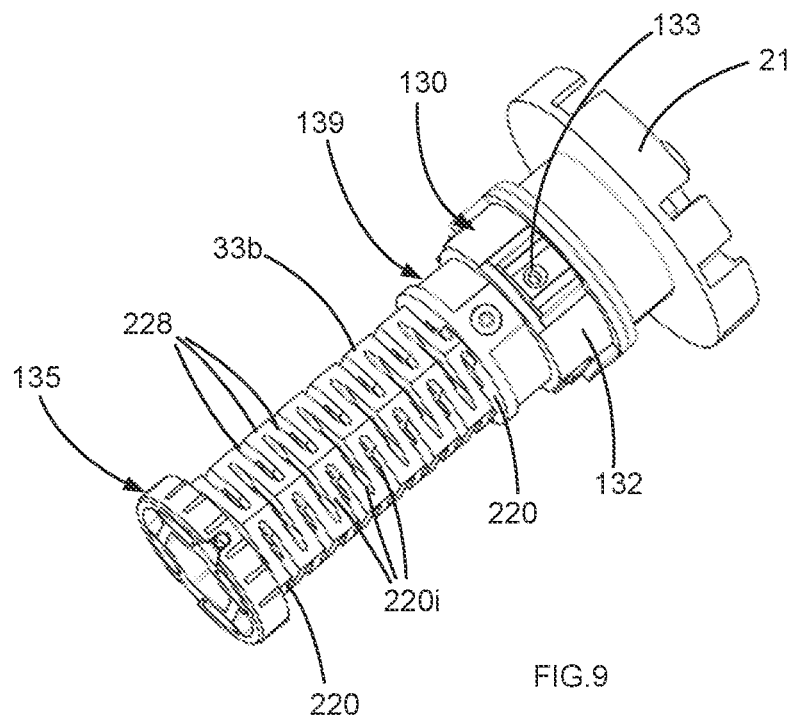

In an embodiment represented partially in FIG. 11, the vibration-filtering mechanical module 33c is produced on a model presented in the application WO2005090736. The vibration-filtering mechanical module 33b comprises, between two end portions (not represented and intended to fix the module to other parts of the actuator which are adjacent to the module), a cylindrical body 230 provided with cutouts 231 oriented perpendicular or substantially perpendicular to the axis of the cylindrical body. Preferably, the cutouts extend over more than half of the section (perpendicular to the axis X) of the cylindrical body. Advantageously, two adjacent cutouts are offset with respect to one another longitudinally on the axis X and angularly with respect to one another about the axis X. Preferably, the cylindrical body is cylindrical of revolution. Alternatively, the cylindrical body can have a polygonal section (perpendicular to the axis X). More preferably, the cylindrical body is hollow or has an opening 232 of axis X.

The flexural flexibility of these last three types of vibration-filtering mechanical modules 33b ensures a degree of freedom, even if the latter comprises a certain stiffness with respect to a degree of freedom of slide type as is possible with an Oldham coupling.

In the different embodiments of the vibration-filtering mechanical module described above, a first end 35, 135 of the vibration-filtering mechanical module 33 is fixed directly or indirectly to the casing and a second end 39, 139 of the vibration-filtering mechanical module 33 is fixed to the torque support. These ends 35; 135, 39; 139 are separated by a length L. For example, the distance L is the minimum distance measured parallel to the axis X between a point of contact between
- the first end and the casing; and
- the second end and the torque support.

For example, the distance is between 1.5 times and 4 times the outer diameter of the casing 17, preferably between 2 times and 3 times the outer diameter of the casing 17.

The casing extends preferentially above the vibration-filtering mechanical module assembly to mask and protect the latter from external elements (dust, pollution, etc.).

Preferably, the vibration-filtering mechanical module is fixed directly to the casing between the motor and the torque support. More preferably, the vibration-filtering mechanical module is fixed to the casing between the battery housing 241 and the torque support, the battery housing being disposed between the motor and the torque support.

However, in complement or as an alternative, the first end of the vibration-filtering mechanical module 33 can be fixed to the motor, in particular to the stator of the motor, the latter being fixed to the casing. Alternatively, the first end of the vibration-filtering mechanical module 33 can be fixed to the battery housing 241, the latter being itself fixed to the casing.

Thus, the casing comprises an end portion, included between the zone of fixing of the vibration-filtering mechanical module to the casing or the zone of fixing of the element to which the vibration-filtering mechanical module is itself fixed in rotation and its end close to the torque support.

This end portion has a length L' greater than or equal to the length L associated with the vibration-filtering mechanical module, which allows a radial clearance relative to the axis X of the casing with respect to the torque support. The radial compressive flexibility of the vibration-absorption module makes it possible to absorb the radial movements, on an axis perpendicular to the axis of rotation X, of the casing 17 with respect to the torque support 21. Also, the degree of freedom in rotation between the casing 17 with respect to the torque support 21 allows the vibration-absorption module to not interfere in the operation of the vibration-filtering mechanical module.

Advantageously, whatever the embodiment of the vibration-filtering mechanical module, each end portion 35; 135, 39; 139 of the vibration-filtering mechanical module 33 comprises, respectively, a plurality of first and second fixing holes 42, 43, in particular three of them disposed with an angle of 120° with respect to one another, about the axis of rotation X.

The number and the angular position of the first and second fixing holes are not limiting and can be different. There can be two or more first and second fixing holes and, for example, two of them disposed with an angle of 180° with respect to one another.

Advantageously, the first and second fixing holes 42, 43 are formed in zones of reinforcement and/or of overthickness, so as to guarantee the strength of the fixing, on the one hand, between the first end portion 35, 135 and the casing 17 and, on the other hand, between the second end portion 39, 139 and the torque support 21.

Advantageously, the casing 17 and the torque support 21 of the electromechanical actuator 11 comprise, in addition, respectively fixing holes 46, 47, in particular three of them disposed with an angle of 120° with respect to one another, about the axis of rotation X.

Thus, in the assembled configuration of the electromechanical actuator 11, first fixing elements 44 cooperate, in other words are configured to cooperate, with the first fixing holes 42 and the fixing holes 46 of the casing 17, which can also be called first fixing holes 46 of the casing 17. Furthermore, in the assembled configuration of the electromechanical actuator 11, second fixing elements 45 cooperate, in other words are configured to cooperate, with the second fixing holes 43 and the fixing holes 47 of the torque support 21.

The first fixing elements are, for example, screws, notably screws with countersunk heads. The second fixing elements are, for example, screws, notably screws with countersunk heads.

The fixing of the vibration-filtering mechanical module to the torque support can, alternatively or in complement, be produced using one or more grooves, respectively ribs, produced at the end of the vibration-filtering mechanical module and cooperating with one or more ribs, respectively grooves, produced at the end of the torque support.

The vibration-absorption module 130 can comprise a first bushing 131 made of flexible material, notably of elastomer material, disposed around a part 210 of the torque support. The flexible material can notably be a thermoplastic elastomer. This first bushing is also placed in the casing 17. Thus, the loads exerted by the casing on the torque support perpendicular to the axis X pass through the first bushing 131. By correctly choosing the material and the geometry of this first bushing, it is possible to transmit these loads while minimizing the transmission of vibrations perpendicularly to the axis X. The first bushing need not be closed around the axis X. It can even consist of several discrete elements added onto a second bushing 132 made of another material.

In particular, the vibration-absorption module can comprise this second bushing. The second bushing is produced in a rigid material. The rigid material can notably be a polyamide, for example PA6.6. For example, the second bushing is disposed around the first bushing. The presence of the rigid bushing is preferred at the point of contact between two rotating parts, to facilitate this rotation.

The first bushing can be overmolded in the second bushing. Alternatively, the first bushing can be overmolded around the second bushing. Also alternatively, the first bushing can be overmolded between the second bushing and the torque support. The first bushing could consist of an O-ring seal mounted on the second bushing.

Preferably, the first bushing comprises bosses or cleats forming its surfaces in contact with the casing and/or the torque support, the bosses being preferentially arranged parallel to an axis of symmetry X130 of the vibration-absorption module. This axis X130 preferably coincides with the axis X when the actuator is assembled. These bosses make it possible to limit the contact between the vibration-absorption module and the casing and/or the torque support, and limit the stiffness of this contact, thus making it possible to limit the transmission of vibrations.

The second bushing 132 comprises at least one fixing element 133 for fixing to the casing, notably at least one hole, in particular at least one tapped hole.

For example, the second bushing 132 comprises several fixing holes 133, in particular three of them disposed with an angle of 120° with respect to one another, about the axis of rotation X.

The number and the angular position of the fixing holes 133 are not limiting and can be different. There can be two or more fixing holes and, for example, two of them disposed with an angle of 180° with respect to one another.

Advantageously, the casing 17 of the electromechanical actuator 11 comprises, in addition, one or more fixing holes 140 coinciding with the fixing hole or holes 133.

Thus, in the assembled configuration of the electromechanical actuator 11, fixing elements 134 cooperate with fixing holes 133 and the fixing holes 140 of the casing 17 to fix the vibration-absorption module, in particular the second bushing, to the casing.

Preferentially, the fixing holes 133 are situated in zones of reinforcement and/or of overthickness formed by the rigid bushing. These overthicknesses notably make it possible to guarantee the fixing without the fixing elements creating a link with the torque support.

The fixing elements are for example screws or pins, notably screws with countersunk heads.

The fixing of the vibration-absorption module to the casing can alternatively, or in complement, be produced using one or more grooves, respectively ribs, produced on the vibration-absorption module, notably on the second bushing, and cooperating with one or more ribs, respectively grooves, produced in the casing 17.

Preferably, an axial gap on the axis X is formed between the end of the casing 17 and the torque support. This gap can be filled or partially filled by a part of the vibration-absorption module, in particular by a part of the first bushing.

To this end, the vibration-absorption module can comprise a flange ring 138 disposed axially between the torque support 21 and an axial end of the casing 17 when the actuator is assembled. This flange ring 138 also ensures a seal-tightness between the torque support and the casing and a filtering of the axial vibrations if necessary.

In the embodiment described, the vibration-absorption module is fixed to the casing. By contrast, the torque support is simply slidingly mounted in the vibration-absorption module that is fixed to the casing. There is preferably no element to stop axially (in translation and in rotation) the vibration-absorption module relative to the torque support. The vibration-absorption module and the torque support are thus preferably linked to one another by a mechanical link of sliding pivot type.

The vibration-absorption module also constitutes an axial stop for the vibration-filtering module in case of axial load generating deviation between the torque support and the casing. In fact, these two modules are mounted with a restricted axial gap and, for example, upon disassembly of the actuator from the winding tube, the axial strain exerted on the torque support is exerted also on the vibration-filtering module, as long as the latter is not in abutment against the vibration-absorption module. Thus, the vibration-filtering module is protected against excessive tension.

Preferably, the casing and/or the vibration-absorption module comprises a first stop 137a, 137b and the torque support 21 comprises a second stop 212, the first and second stops being arranged so as to cooperate by contact to limit the rotational displacement about the first axis of the casing relative to the torque support. Notably, the first and second stops are intended to cooperate by contact when a torque greater than the nominal torque, notably greater than or equal to 110% of the nominal torque, is produced by the electric motor.

For example, first stops consist of the flanks 137a and 137b of grooves 137 produced in the second bushing. The flanks extend substantially radially relative to the axis X.

For example, second stops consist of ribs 212 produced on the torque support and extending substantially radially relative to the axis X.

In practice, the first and second stops are not in contact when the actuator is first sold, even though problems of creep of the elastomers can then provoke a contact during the life of the actuator.

Likewise, the first and second stops are not in contact when the actuator supplies a torque lower than the nominal torque.

The purpose of the contact between the stops is to protect the vibration-filtering mechanical module against a possible breakage in case of high torque.

In the different embodiments, the casing partially or fully covers the vibration-filtering mechanical module and/or the vibration-absorption module. Thus, preferably, when looking at the actuator from a direction perpendicular to the axis X, the vibration-filtering mechanical module is completely hidden in the casing and is not visible. Likewise, preferably, when looking at the actuator from a direction perpendicular to the axis X, the vibration-absorption module is completely hidden in the casing and is not visible.

In a variant not represented, the electromechanical actuator 11 can be inserted into a rail, in particular of square or rectangular section, that can be open at one or both of its ends, in the assembled configuration of the device 3. Moreover, the electromechanical actuator 11 can be configured to drive a drive shaft on which cords for displacing and/or orienting slats of the screen 2 are wound.

The invention claimed is:

1. An electromechanical actuator for a closure, covering or solar protection installation, the electromechanical actuator comprising, an electric motor, a casing, a vibration-filtering mechanical module, a vibration-absorption module, and a torque support, inserted at least partially into the casing, wherein the vibration-filtering mechanical module comprises a first end and a second end, separated by a length L, the first end of the vibration-filtering mechanical module being mechanically linked directly or indirectly to the casing, the second end of the vibration-filtering mechanical module being mechanically linked to the torque support, the vibration-filtering mechanical module ensuring the mechanical link between the casing and the torque support in rotation about a first axis of the actuator, and the vibration-absorption module mechanically linking the casing, to the torque support in translation perpendicularly to the first axis of the actuator by allowing a degree of freedom in rotation between the casing and the torque support about the first axis.

2. The actuator as claimed in claim 1, wherein the vibration-filtering mechanical module comprises an Oldham coupling or a Schmidt coupling.

3. The actuator as claimed in claim 1, wherein the vibration-filtering mechanical module comprises at least:

a first end portion comprising a first ring, an intermediate portion, and a plurality of first arms, each first arm linking the intermediate portion to the first ring.

4. The actuator as claimed in claim 1, wherein the vibration-filtering mechanical module comprises several annular plates disposed perpendicularly to the first axis and juxtaposed along the first axis, including at least one intermediate annular plate, each intermediate annular plate being linked to each of the two plates which are adjacent to it by at least three connection bridges.

5. The actuator as claimed claim 1, wherein the casing partially or fully covers at east one selected from the group consisting of the vibration-filtering mechanical module and the vibration-absorption module.

6. The actuator as claimed in claim 1, wherein the vibration-absorption module comprises a first bushing made of flexible material disposed around a part of the torque support.

7. The actuator as claimed in claim 1, wherein the first bushing made of flexible material comprises bosses forming a surface of the first bushing or surfaces in contact with at least one selected from the group consisting of the casing and the torque support.

8. The actuator as claimed in claim 6, wherein the vibration-absorption module comprises a second bushing made of rigid material, disposed around the first bushing or inserted into the first bushing.

9. The actuator as claimed in claim 8, wherein the second bushing made of rigid material comprises zones of reinforcement and/or of overthickness.

10. The actuator as claimed in claim 8, wherein the second bushing comprises at least one selected from the group consisting of:
- at least one fixing element for fixing to the casing,
- at least one groove,
- at least one hole.

11. The actuator as claimed in claim 1, wherein the vibration-absorption module comprises a flange ring disposed axially between the torque support and an axial end of the casing.

12. The actuator as claimed in claim 1, wherein at least one selected from the group consisting of the casing and the vibration-absorption module comprises a first stop, and wherein the torque support comprises a second stop, the first and second stops being arranged so as to cooperate by contact to limit the rotational displacement of the casing about the first axis relative to the torque support.

13. The actuator as claimed in claim 1, wherein the actuator comprises a housing for at least one battery in the casing.

14. A home-automation closure, covering or solar protection installation comprising:
- a screen,
- a winding tube, and
- an electromechanical actuator as claimed in claim 1, wherein the screen is able to be wound on the winding tube driven in rotation by the electromechanical actuator.

15. The actuator as claimed in claim 6, wherein the flexible material is at least one of an elastomer and a viscoelastic material.

16. The actuator as claimed in claim 15, wherein the first bushing made of flexible material comprises bosses forming a surface of the first bushing or surfaces in contact with at least one selected from the group consisting of the casing and the torque support.

17. The actuator as claimed in claim 7, wherein the vibration-absorption module comprises a second bushing made of rigid material, disposed around the first bushing or inserted into the first bushing.

18. The actuator as claimed in claim 17, wherein the second bushing made of rigid material comprises zones of reinforcement and/or of overthickness.

19. The actuator as claimed in claim 10, wherein the at least one hole includes at least one tapped hole.

20. The actuator as claimed in claim 12, wherein the first and second stops are adapted to cooperate by contact when a torque greater than the nominal torque is produced by the electric motor.

* * * * *